US011891512B2

(12) United States Patent
Sweeney et al.

(10) Patent No.: US 11,891,512 B2
(45) Date of Patent: Feb. 6, 2024

(54) REDOX CURABLE COMPOSITIONS AND METHODS OF MANUFACTURE THEREOF

(71) Applicant: Henkel AG & Co. KGaA, Duesseldorf (DE)

(72) Inventors: Nigel Sweeney, Dublin (IE); Mark Loane, Naas (IE); Brendan Kneafsey, Lucan (IE); Rory Barnes, Lucan (IE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 17/959,173

(22) Filed: Oct. 3, 2022

(65) Prior Publication Data
US 2023/0147662 A1 May 11, 2023

Related U.S. Application Data

(63) Continuation of application No. PCT/EP2021/057444, filed on Mar. 23, 2021.

(30) Foreign Application Priority Data

Apr. 1, 2020 (GB) .................................... 2004823

(51) Int. Cl.
C08L 75/16 (2006.01)
B32B 7/12 (2006.01)
(Continued)

(52) U.S. Cl.
CPC ................ C08L 75/16 (2013.01); B32B 7/12 (2013.01); B32B 37/06 (2013.01); B32B 37/10 (2013.01);
(Continued)

(58) Field of Classification Search
CPC ...... C08L 75/16; C09J 175/16; C08F 290/067
See application file for complete search history.

(56) References Cited

U.S. PATENT DOCUMENTS 3,218,305 A 11/1965 Krieble
3,425,988 A 2/1969 Jeremy et al.
(Continued)

FOREIGN PATENT DOCUMENTS

| EP | 1359173 A1 * 11/2003 | .......... C08F 290/061 |
|---|---|---|
| WO | 2008101661 A1 | 8/2008 |
| WO | 2016175112 A1 | 11/2016 |

OTHER PUBLICATIONS

R.D. Rich, "Anaerobic Adhesives" in Handbook of Adhesive Technology, 29, 467-79, A. Pizzi and K.L. Mittal, eds., Marcel Dekker, Inc., New York (1994).

(Continued)

*Primary Examiner* — Michael M Dollinger
(74) *Attorney, Agent, or Firm* — Steven C. Bauman

(57) ABSTRACT

A redox curable composition, methods for manufacturing same and uses thereof are disclosed. The redox curable composition is useful as a pre-applied adhesive. The redox curable composition is solid at room temperature, may be heated for application to a substrate, and cools to form a dry-to-touch adhesive layer on said substrate, which may be activated when required by mating with another substrate and exposure to an anaerobic environment. The composition is particularly suited to manufacturing complex products, such as mobile phones, computers and circuits.

24 Claims, 2 Drawing Sheets

(51) Int. Cl.
*B32B 37/06* (2006.01)
*B32B 37/10* (2006.01)
*B32B 37/18* (2006.01)
*C09J 175/16* (2006.01)
*B32B 15/088* (2006.01)
*B32B 15/18* (2006.01)
*B32B 27/08* (2006.01)
*B32B 27/20* (2006.01)
*B32B 27/34* (2006.01)
*B32B 37/12* (2006.01)
*C09J 175/04* (2006.01)

(52) U.S. Cl.
CPC ............ *B32B 37/18* (2013.01); *C09J 175/16* (2013.01); *B32B 15/088* (2013.01); *B32B 15/18* (2013.01); *B32B 27/08* (2013.01); *B32B 27/20* (2013.01); *B32B 27/34* (2013.01); *B32B 2037/1253* (2013.01); *B32B 2255/06* (2013.01); *B32B 2255/10* (2013.01); *B32B 2255/26* (2013.01); *B32B 2262/101* (2013.01); *B32B 2307/54* (2013.01); *B32B 2309/04* (2013.01); *B32B 2309/12* (2013.01); *B32B 2311/30* (2013.01); *B32B 2377/00* (2013.01); *C09J 175/04* (2013.01)

(56) References Cited

U.S. PATENT DOCUMENTS

| | | | |
|---|---|---|---|
| 4,039,705 | A | 8/1977 | Douek et al. |
| 4,180,640 | A | 12/1979 | Doherty et al. |
| 4,287,330 | A | 9/1981 | Rich |
| 4,321,349 | A | 3/1982 | Rich |
| 4,717,739 | A * | 1/1988 | Chevreux ......... B32B 17/10706 156/99 |
| 6,451,927 | B1 | 9/2002 | Haas et al. |
| 9,305,892 | B2 | 4/2016 | Yoko et al. |
| 2003/0060588 | A1* | 3/2003 | Jacobine .............. C08G 18/672 528/44 |
| 2004/0228998 | A1 | 11/2004 | Haas |
| 2005/0075411 | A1* | 4/2005 | Wenning ............. C08G 18/423 522/71 |
| 2007/0021533 | A1 | 1/2007 | Yan et al. |
| 2012/0040120 | A1* | 2/2012 | Schwalm ............. C08G 18/755 428/36.9 |

OTHER PUBLICATIONS

PCT International Search Report issued in connection with International Application No. PCT/EP2021/057444 dated Jul. 27, 2021.

* cited by examiner

REDOX CURABLE COMPOSITIONS AND METHODS OF MANUFACTURE THEREOF

FIELD

The present invention relates to a curable composition which can be pre-applied to an article for example in the form of a non-mobile, substantially non-tacky coating. The article can thus be conveniently handled, packed, transported and stored for an extended period, after which the coating can be caused to cure at a selected time. Of particular interest is a curable composition that cures anaerobically. A composition that can be pre-applied to an article in the form of a non-mobile, substantially non-tacky coating and then later cured anaerobically is of interest. One end-use application of such compositions is in the adhesion of component parts of mobile phones, and/or hand-held devices.

BACKGROUND

Anaerobically curable compositions generally are well known. See e.g. R. D. Rich, "Anaerobic Adhesives" in Handbook of Adhesive Technology, 29, 467-79, A. Pizzi and K. L. Mittal, eds., Marcel Dekker, Inc., New York (1994), and references cited therein. Their uses are legion and new applications continue to be developed.

Anaerobic adhesive systems are those which are stable in the presence of oxygen, but which polymerize in the absence of oxygen. Polymerization is initiated by the presence of free radicals, often generated from peroxy compounds. Anaerobic adhesive compositions are well known for their ability to remain in a liquid, unpolymerized state in the presence of oxygen and to cure to a solid state upon the exclusion of oxygen.

Often times anaerobic adhesive systems comprise resin monomers terminated with polymerizable acrylate ester such as methacrylate, ethylacrylate and chloroacrylate esters [e.g., polyethylene glycol dimethacrylate and urethane-acrylates (e.g., U.S. Pat. No. 3,425,988 (Gorman)] derived according to known urethane chemistry. Other ingredients typically present in anaerobically curable adhesive compositions include initiators, such as an organic hydroperoxide for example cumene hydroperoxide, tertiary butyl hydroperoxide and the like, accelerators to increase the rate at which the composition cures, and stabilizers such as quinone or hydroquinone, which are included to help prevent premature polymerization of the adhesive due to decomposition of peroxy compounds.

Desirable cure-inducing compositions to induce and accelerate anaerobic cure may include one or more of saccharin, toluidines, such as N,N-diethyl-p-toluidine ("DE-p-T") and N,N-dimethyl-o-toluidine ("DM-o-T"), and acetyl phenyl hydrazine ("APH") with maleic acid. See e.g. U.S. Pat. No. 3,218,305 (Krieble), U.S. Pat. No. 4,180,640 (Melody), U.S. Pat. No. 4,287,330 (Rich) and U.S. Pat. No. 4,321,349 (Rich).

Saccharin and APH are used as standard cure accelerator components in anaerobic adhesive cure systems. Indeed, many of the LOCTITE®-brand anaerobic adhesive products currently available from Henkel Corporation use either saccharin alone or both saccharin and APH.

Anaerobically curable adhesive compositions also commonly include chelators such as ethylenediamine tetraacetic acid (EDTA) which are employed to sequester metal ions.

Preparation of anaerobically curable compositions which includes an anaerobically curable component typically involves a liquid carrier component. The composition is thus typically in a liquid form and may be dispensed, for example by an applicator. For use, the anaerobically curable component is applied by a suitable applicator, to form a layer or coating on the surface. Often anaerobically curable compositions are applied as a bead, for example a continuous bead to form a gasket.

The anaerobically curable material often remains wet even after application until exposed to anaerobic conditions suitable for cure. For example in many cases an anaerobic curable composition contains a liquid monomer.

Even though the anaerobic curable composition may dry off somewhat, for example through evaporation (by being dried, or allowed to dry for a period), the material often remains wet and tacky. This leads to: potential contamination of anything that contacts the articles to which the material has been applied and also unwanted removal of the material which has been applied. The latter concern potentially compromises the integrity of any bond or seal later formed by the anaerobically curable composition because an insufficient amount may remain to form the desired bond or seal.

And of course where the liquid carrier material is itself the liquid monomer, it will remain in its liquid form until such time as it is anaerobically cured. So even though these compositions may be applied on a substrate, awaiting exposure to anaerobic conditions, they will remain wet or at least tacky until cured.

In the past additional components such as thickeners have been added to the material to make it less flowable but because other components are liquid the overall composition remains somewhat flowable and/or tacky.

Dispensing liquid compositions onto anything other than the top of a horizontal surface leads to run-off and dripping. Numerous attempts have been made to incorporate substances into liquid anaerobically curable compositions in order to form non-flowable or at least more viscous adhesives. This is also important in the context of threadlockers. See e.g. U.S. Pat. No. 6,451,927.

US Patent Application Publication No. 2004/0228998 is concerned with curable film preform compositions. A curable preform including a curable liquid precursor having a polymer powder mixed therethrough such that the resulting preform has a tensile strength of greater than one pound per square inch is described therein. An exemplified preform film is formed by combining polyethylene glycol dimethacrylate anaerobic adhesive with polymethyl methacrylate having a mean particle size of about 61 microns, a glass transition temperature of 90° C., and a viscosity of 325 cubic centimetres per gram. Upon mixing a pourable mixture results which was heated to 82° C. for 10 minutes and subsequently cooled to 20° C. to provide a stretchy, slightly tacky preform. The curable preform may be formed as a film and cut to a desired shape. As the compositions are tacky they are unsuited for use in pre-applied applications. It would be desirable to have dry-to-touch adhesive compositions which may be pre-applied to a part, the part could subsequently be shipped without risk of contamination or premature cure of the adhesive, and the part having the per-applied dry-to-touch adhesive thereon subsequently bonded to another part when desired.

US Patent Application Publication No. 2007/0021533 is concerned with an encapsulated curable adhesive composition for use as a structural adhesive. The adhesive composition comprises a first population of microcapsules encasing a monomer and a first-part curative comprising an initiator. The composition further comprises a second-part curative. The second-part curative comprises an activator and a catalyst. A least the activator of the second-part curative is preferably encapsulated in a second population of microcapsules. Reactive contact of the monomer and first-part curative with the second-part curative is effected by exuding the respective capsule contents into reactive contact through breakage of the microcapsules. The compositions are suited for forming dry-to-touch adhesives. However, the compositions are not suited for high performance bonding of a wide variety of substrates.

U.S. Pat. No. 9,305,892 is concerned with an adhesive composition for a pre-applied underfill sealant comprising: (a) a radical polymerizable monomer having one or more functional groups selected from the group consisting of vinyl group, maleimide group, acryloyl group, methacryloyl group and allyl group, (b) a polymer having a polar group, (c) a filler and (d) a thermal radical initiator. The adhesive composition can be in the form of a liquid or in the form of a film. When in the form of a film, the adhesive composition can be laminated to a support tape, after which the adhesive composition will be B-staged. B-staging refers to heating the adhesive composition to the extent that the respective constituents contained in the composition do not proactively initiate a reaction (cure), but, the adhesive composition is rendered dry, that is, non-tacky, by volatilizing any solvent. In other cases, B-staging an adhesive to a non-tacky state is accomplished by a partial curing or setting up.

In the manufacture of complex products comprising multiple component parts, for example in the manufacture of mobile phones, televisions, computers etc. which comprise inter alia electronic circuitry, chip boards, mounting substrates and displays, oftentimes manufacture of a component part occurs in a different location to where final product assembly occurs. Employing dry-to-touch adhesives advantageously facilitates pre-application of the curable adhesive to a part, which can then be shipped to a different location without worrying about contamination of the adhesive. This would not be readily accomplished using tacky curable adhesives. Thus providing curable adhesive compositions which remain stable in an uncured dry-to-touch state, and can be subsequently activated when required is highly desirable. Furthermore, providing such adhesives which facilitate bonding of multiple substrate types, for example metal to metal bonding, metal to plastic bonding, glass to glass bonding, glass to metal bonding, glass to plastic bonding, and/or plastic to plastic bonding would also be highly advantageous. Furthermore providing compositions suitable for high performance bonding is particularly desirable. These and other desires are provided by the compositions disclosed herein.

SUMMARY

In one aspect, the present invention provides a redox curable composition comprising:
  a liquid (meth)acrylate monomer component;
  a solid thermoplastic polyurethane resin having a molecular weight in the range of from 40,000 g/mol to 100,000 g/mol and a melting point in the range of from 40° C. to 80° C.;
  a solid curable polyurethane (meth)acrylate resin having a molecular weight in the range of from 5,000 g/mol to 35,000 g/mol, and a melting point in the range of from 50° C. to 80° C.; and
  a curing component for curing the liquid (meth)acrylate monomer component.

Advantageously, the inventive compositions may be applied to a substrate in a molten state and allowed to solidify, for example forming a dry-to-touch film on the substrate. Advantageously, the curable composition becomes non-flowable and solidifies once applied to a substrate from a molten state within a period of less than about 5 minutes at room temperature. An assembly can be formed by mating the substrate to which the inventive composition has been applied with another substrate, and cure can be initiated when required by applying heat to melt the adhesive and initiate a redox cure. The compositions may cure under anaerobic conditions i.e. the redox curable compositions may be anaerobically curable compositions. Cure of the anaerobic compositions may be effected by exposure of said compositions to an anaerobic environment.

The solid thermoplastic polyurethane resin having a molecular weight in the range of from 40,000 g/mol to 100,000 g/mol and a melting point in the range of from 40° C. to 80° C. If the molecular weight is below about 40,000 g/mol the cured compositions tend to be brittle. If the molecular weight range is greater than about 100,000 g/mol the compositions tend to be tacky and achieving dry-to-touch is difficult.

The solid curable polyurethane (meth)acrylate resin having a molecular weight in the range of from 5,000 g/mol to 35,000 g/mol, and a melting point in the range of from 50° C. to 80° C. This temperature range is optimal for redox curing components, particularly those comprising peroxides.

The liquid (meth)acrylate monomer may be present in an amount of about 10 wt % to about 60 wt % based on the total weight of the curable composition, for example in an amount of from about 15 wt % to about 55 wt % based on the total weight of the curable composition, suitably in an amount of from about 25 wt % to about 50 wt % based on the total weight of the curable composition.

The solid thermoplastic polyurethane resin may be present in an amount of from about 5 wt % to about 40 wt % based on the total weight of the curable composition, for example in an amount of from about 7.5 wt % to about 30 wt % based on the total weight of the curable composition in an amount of from about 10 wt % to about 20 wt % based on the total weight of the curable composition, suitably in an amount of from about 10 wt % to about 18 wt % on the total weight of the curable composition. Compositions with less than about 5 wt % of the solid thermoplastic polyurethane resin specified herein tend to be brittle and poor structural bonding and solid forming properties are observed. Compositions with greater than about 40 wt % of said solid thermoplastic polyurethane resin tend to have less effective adhesion properties when cured. The redox curable compositions of the invention achieve optimal dry-to-touch properties in the uncured state when the amount of the solid thermoplastic polyurethane resin is present in the compositions in an amount of from about 10 wt % to about 20 wt %.

The solid curable polyurethane (meth)acrylate resin is present in an amount of from about 20 wt % to about 70 wt % based on the total weight of the curable composition, for example in an amount of from about 30 wt % to about 65 wt % based on the total weight of the curable composition, suitably in an amount of from about 40 wt % to about 60 wt % based on the total weight of the curable composition. Compositions comprising less than about 20 wt % of the solid curable polyurethane (meth)acrylate resin tend to be more liquid, and forming dry-to-touch redox curable compositions is more challenging. Compositions comprising greater than about 70 wt % of the solid curable polyurethane (meth)acrylate resin tend to have less effective adhesive properties. Optimal drying time and adhesive performance is achieved when the redox curable composition comprises the solid curable polyurethane (meth)acrylate resin in an amount of from about 30 wt % to about 65 wt %.

The curing component for curing the liquid (meth)acrylate monomer component comprises may be present in an amount of from about 0.1 to about 10%, such as from about 1 to about 5%, for example about 5% by weight based on the total weight of the composition, and/or wherein the curing component comprises a peroxide.

The liquid (meth)acrylate monomer component may be one or more selected from those having the formula:

where G may be hydrogen, halogen or alkyl groups having from 1 to 4 carbon atoms, and $R^8$ may be selected from alkyl, cycloalkyl, alkenyl, cycloalkenyl, alkaryl, alkaryl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

The curing agent may be one or more selected from the group consisting of 1-acetyl-2-phenylhydrazine, N,N-dimethyl para toluidine, N,N-diethyl para toluidine, N,N-diethanol para toluidine, N,N-dimethyl ortho toluidine, N,N-dimethyl meta toluidine, indoline, 2-methylindoline, isoindoline, indole, 1,2,3,4-tetrahydroquinoline, 3-methyl-1,2,3,4-tetrahydro-quinoline, 2-methyl-1,2,3,4-tetrahydroquinoline, and 1,2,3,4-tetrahydroquinoline-4-carboxylic acid.

The compositions of the invention may further comprise an initiator of free radical polymerization, such as a peroxide.

The initiator of free radical polymerization may be one or more selected from the group consisting of: cumene hydroperoxide ("CHP"), para-menthane hydroperoxide, t-butyl hydroperoxide ("TBH"), t-butyl perbenzoate, benzoyl peroxide, dibenzoyl peroxide, 1,3-bis(t-butylperoxyisopropyl) benzene, diacetyl peroxide, butyl 4,4-bis(t-butylperoxy) valerate, p-chlorobenzoyl peroxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane, t-amyl hydroperoxide, 1,2,3,4-tetramethylbutyl hydroperoxide and combinations thereof.

The free radical cure inducing component may comprise an encapsulated peroxide.

The compositions of the invention may further comprise a cure accelerator. Advantageously, the presence of a cure accelerator facilitates cure of the compositions of the invention on "non-active" or "passive" substrates, such as plastic substrates. Furthermore, the presence of a cure accelerator facilitates cure through volume of the adhesive composition if a bond gap exists, between substrates to be bonded.

Suitably, the cure accelerator may comprise one or more metallocenes, such as ferrocene, suitably, n-butyl ferrocene. A particularly useful cure accelerator is benzoyl cyclohexyl thiourea.

Compositions of the invention can be applied in any manner. One advantage is that the compositions of the invention can be made and/or applied to a substrate in a manner that does not require use of a solvent. Solvents—organic solvent or water—are thus not required. This avoids the necessity for a liquid carrier for the composition. A composition of the invention is essentially dry with consequent handling advantages. For example the compositions of the invention will flow in particulate form and there is no requirement for a liquid carrier, and there is no requirement for drying off of solvent or water to achieve application to a substrate.

Dry-handling of the product, for example on production lines, is thus both achievable and advantageous. Once applied (to a substrate) compositions of the invention will also be dry. Dry-to-touch products are desirable from a handling point of view to eliminate contamination, fouling, spillages, loss of composition from a substrate etc. Advantageously, the compositions of the invention may be used to form pre-applied dry-to-touch adhesive on a substrate, for example, by heating the curable composition from its solid state, to a molten state and then applying the molten curable composition to a substrate at room temperature, and allowing said molten curable composition to cool and solidify on the substrate, thereby forming a pre-applied adhesive on said substrate. The curable composition becomes dry-to-touch from its molten state after application to the substrate at room temperature, within a period of less than about 5 minutes, suitably, within a period of from about 30 seconds to 300 seconds, for example in a period of from about 30 seconds to 120 seconds.

Compositions of the invention have many end-use applications as with traditional anaerobically curable compositions.

It will be appreciated that as the compositions of the invention are solid, they may be provided in any designed form/shape.

Another aspect of the present invention provides a cured composition formed by curing the inventive curable compositions claimed herein. Suitably, the curable composition may be cured by exposure to an anaerobic environment. The curable composition may for example be cured by exposure to an anaerobic environment for a period in the range of from about 1 minute to 30 minutes, such as from about 1 minute to about 20 minutes. Optionally, the curable composition may be cured within the temperature range of from about 40° C. to about 100° C. For example, the curable composition may be cured by exposure to an anaerobic environment for a period in the range of from about 1 minute to about 30 minutes, within a temperature range of from about 40° C. to about 100° C.

In another aspect the present invention provides a method for bonding together two substrates, comprising the steps of:
applying the redox curable composition of the invention to at least one of the substrates,
mating together the substrates to form a mated assembly, for a time sufficient for cure of the redox curable composition to take place.

Suitably, cure of the redox curable composition is initiated by heating the curable composition, and/or exposing the curable composition to pressure. Cure of the redox curable composition may be initiated by exposing the curable compositions to an anaerobic environment. Optionally, cure of the redox curable composition is initiated by heating the curable composition, and/or exposing the curable composition to pressure in an anaerobic environment.

The substrates may be mated using a heat press. The heat press applies a pressure of at least 2 bar to the mated assembly, suitably a pressure of at least 4 bar.

In the method of the invention, the compositions of the invention may be cured by applying heat and/or pressure to the mated assembly for a period of 30 seconds or more, such as for 1 minute or more, for example for 5 minutes or more, or for 20 minutes or more. For example, the heat and/or pressure is applied to the mated assembly for a period of from 1 minute to 20 minutes.

One or more of the substrates to be bonded may be primed with a primer prior to application of the redox curable composition of the invention. Advantageously, the application of a primer facilitates bonding of a wide variety of substrates using the compositions of the invention. Suitably, the primer may be a thiourea or a thiourethane.

DETAILED DESCRIPTION

Figure 1:
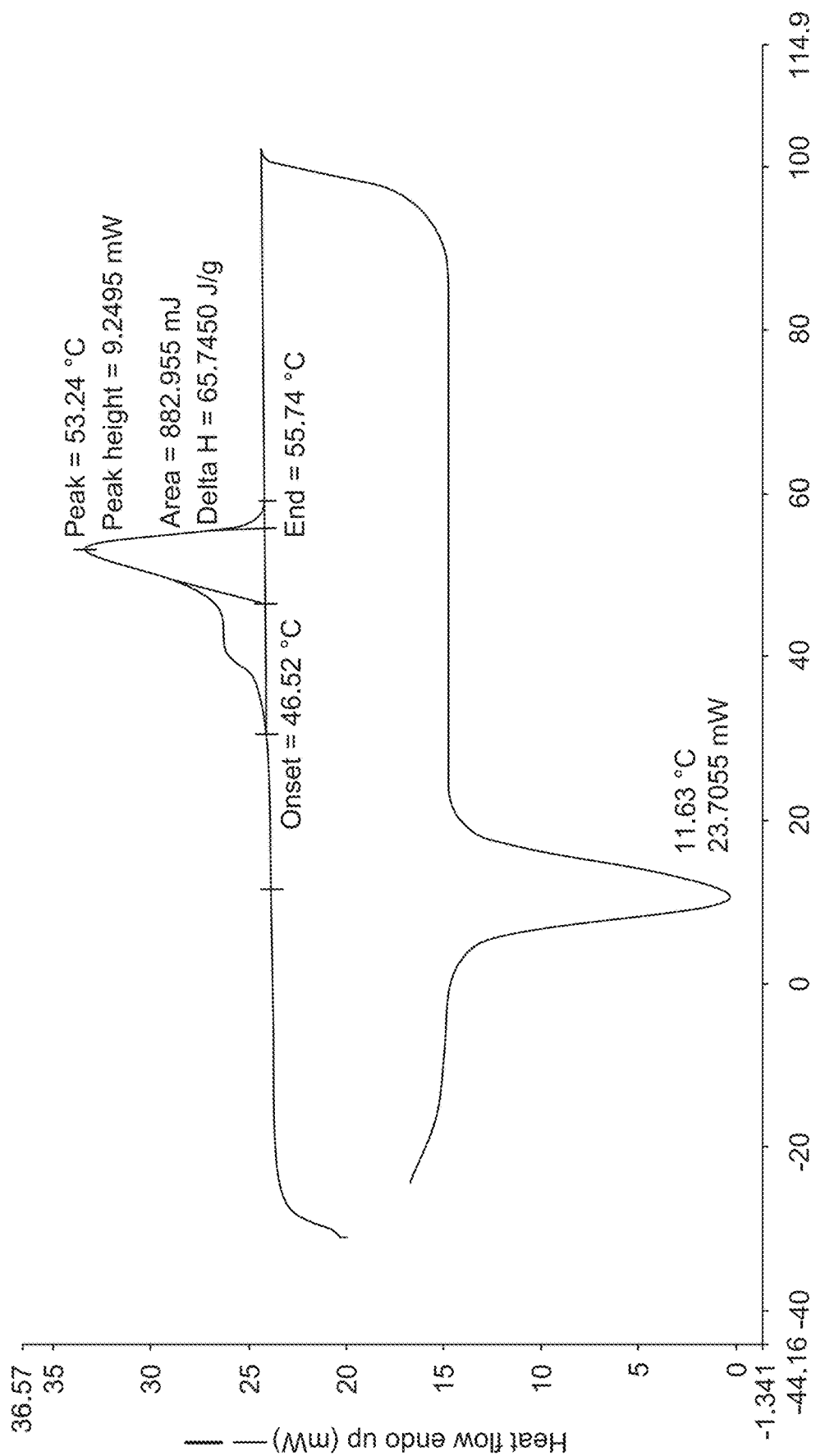
FIG. 1 shows a DSC thermogram for a solid thermoplastic polyurethane resin for use in the present invention, said resin having a molecular weight in the range of from 40,000 g/mol and 100,000 g/mol.
Figure 2:
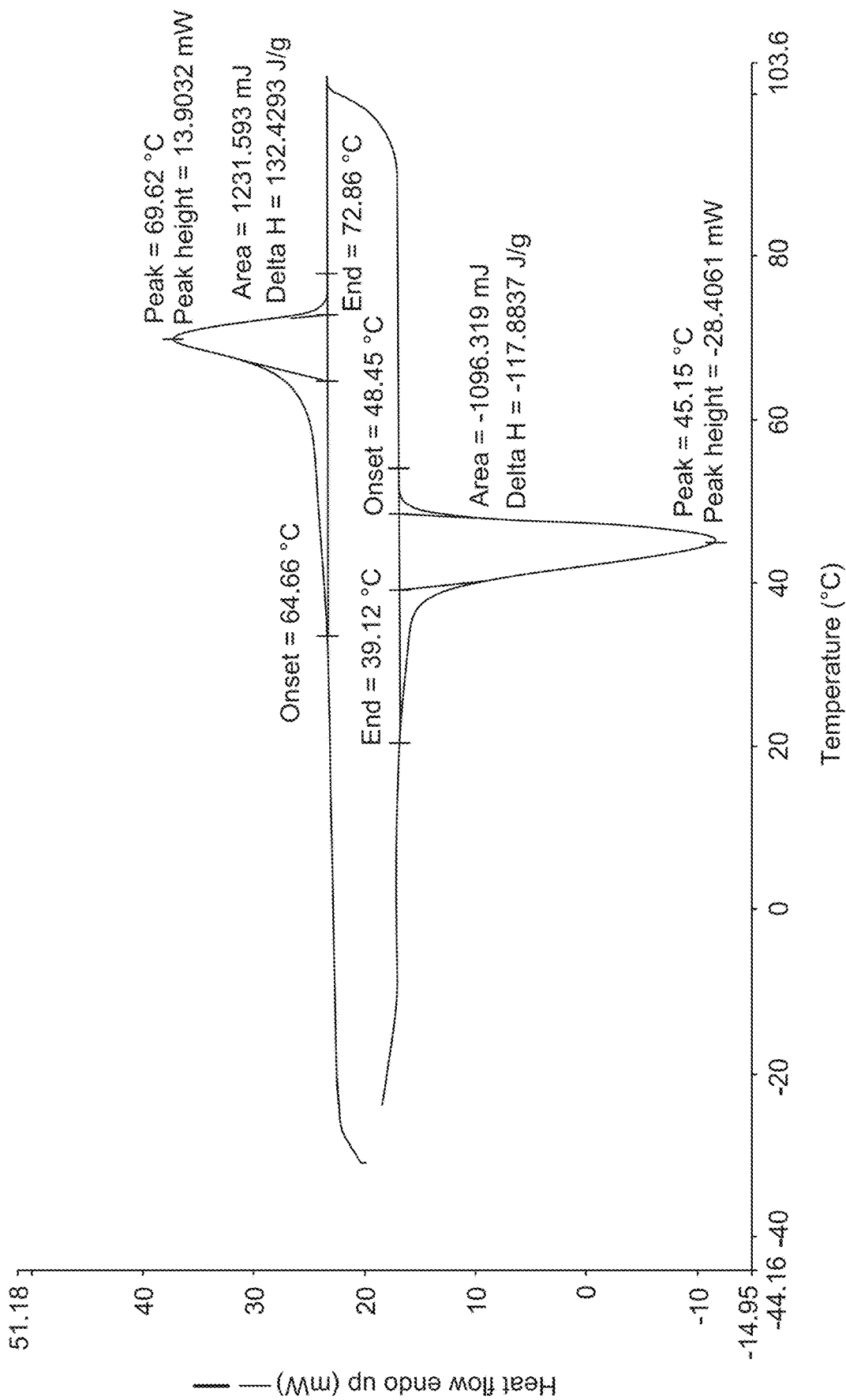
FIG. 2 shows a DSC thermogram for a solid curable polyurethane (meth)acrylate resin for use in the present invention, said resin having a molecular weight in the range of from about 5,000 g/mol to 35,000 g/mol.

As noted above, the present invention provides a redox curable composition, such as an anaerobically curable composition, comprising:
  a liquid (meth)acrylate monomer component;
  a solid thermoplastic polyurethane resin having a molecular weight in the range of from 40,000 g/mol to 100,000 g/mol and a melting point in the range of from 40° C. to 80° C.;
  a solid curable polyurethane (meth)acrylate resin having a molecular weight in the range of from 5,000 g/mol to 35,000 g/mol, and a melting point in the range of from 50° C. to 80° C.; and
  a curing component for curing the liquid (meth)acrylate monomer component.

Definitions and Standard Test Methods

The term "liquid" means in a liquid state within the temperature range of from about 5° C. to 30° C., suitably in a liquid state at room temperature and at atmospheric pressure.

The term "solid" means in a solid state within the temperature range of from about 5° C. to 40° C., suitably in a solid state at room temperature and at atmospheric pressure. Solid state is defined as the state of matter in which materials are not fluid but retain their boundaries without support, the atoms or molecules occupying fixed positions with respect to each other and unable to move freely. The pre-applied adhesive composition of the invention are substantially dry-to-touch. Said compositions may be applied from a molten state to a substrate, whereon they form dry-to-touch solid curable compositions. Dry-to-touch is defined as non-flowable at room temperature, within a period of up to 5 minutes at room temperature, suitably, within a period of from about 30 seconds to about 300 seconds at room temperature, suitably, within a period of from about 30 seconds to 120 seconds at room temperature.

Molecular weights disclosed herein are determined in accordance with ISO 13885-1:2008, "Binders for paints and varnishes—Gel permeation chromatography (GPC)—Part 1: Tetrahydrofuran (THF) as eluent".

Melting and re-solidification temperature ranges were measured in accordance with ISO 1137-1:2016 "Plastics—Differential scanning calorimetry (DSC)—Part 1 General Principles".

The liquid (meth)acrylate component may comprises one or more (meth)acrylate monomers selected from beta-carboxy ethyl acrylate, isobornyl acrylate, n-octyl acrylate, n-decyl acrylate, cyclohexyl acrylate, tetrahydrofurfuryl acrylate, 2-ethylhexyl acrylate, ethoxyethoxyethyl acrylate, ethoxylated phenyl monoacrylate, hydroxyethyl acrylate, hydroxypropyl acrylate, hydroxybutyl acrylate, isooctyl acrylate, n-butyl acrylate, neopentyl glycol diacrylate, ethylene glycol diacrylate, diethylene glycol diacrylate, dipropylene glycol diacrylate, triethylene glycol diacrylate, tetraethylene glycol diacrylate, 1,6-hexane diol diacrylate, tripropylene glycol diacrylate, glycerol triacrylate, trimethylol propane diacrylate, trimethylol propane triacrylate, pentaerythritol tetraacrylate, phenoxyethyl acrylate, hydroxyethyl methacrylate, hydroxypropyl methacrylate, cyclohexyl methacrylate, glycerol mono-methacrylate, glycerol 1,3-dimethacrylate, trimethyl cyclohexyl methacrylate, methyl triglycol methacrylate, isobornyl methacrylate, trimethylolpropane trimethacrylate, neopentyl glycol dimethacrylate, ethylene glycol dimethacrylate, diethylene glycol dimethacrylate, 1,6-hexanediol dimethacrylate, hydroxybutyl methacrylate, tetrahydrofurfuryl methacrylate, cyclohexyl methacrylate, phenoxyethyl methacrylate, glycerol methacrylate, glycidyl methacrylate, methyl methacrylate and methacrylic acid and mixtures thereof.

Preferred liquid (meth)acrylate monomers include 2-hydroxyethyl methacrylate, 2-hydroxypropyl methacrylate, tetrahydrofurfuryl methacrylate, isobornyl methacrylate, phenoxyethyl methacrylate and methacrylic acid.

The composition may also comprise a solid (meth)acrylate in the range of from about 5% to about 15% based on the total weight of the composition.

Additionally one or more suitable (meth)acrylates may be chosen from among polyfunctional (meth)acrylates, such as, but not limited to, di-or tri-functional (meth)acrylates like polyethylene glycol di(meth)acrylates, diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate, polyethyleneglycol di(meth)acrylates and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

For example, the redox curable component may include Bisphenol A dimethacrylate:

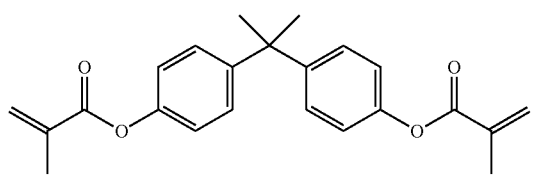

Suitably, the redox curable composition may include ethoxylated bisphenol A di(meth)acrylate.

Still other (meth)acrylates that may be suitable for use herein are silicone (meth)acrylate moieties ("SiMA"), such as those taught by and claimed in U.S. Pat. No. 5,605,999 (Chu), the disclosure of which is hereby expressly incorporated herein by reference.

Other suitable materials may be chosen from polyacrylate esters represented by the formula:

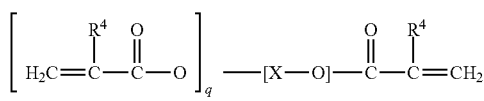

where $R^4$ is a radical selected from hydrogen, halogen or alkyl of from 1 to about 4 carbon atoms; q is an integer equal to at least 1, and preferably equal to from 1 to about 4; and X is an organic radical containing at least two carbon atoms and having a total bonding capacity of q plus 1. With regard to the upper limit for the number of carbon atoms in X, workable monomers exist at essentially any value. As a practical matter, however, a general upper limit is about 50 carbon atoms, such as desirably about 30, and desirably about 20.

For example, X can be an organic radical of the formula:

where each of $Y^1$ and $Y^2$ is an organic radical, such as a hydrocarbon group, containing at least 2 carbon atoms, and desirably from 2 to about 10 carbon atoms, and Z is an organic radical, preferably a hydrocarbon group, containing at least 1 carbon atom, and preferably from 2 to about 10 carbon atoms. Other materials may be chosen from the reaction products of di- or tri-alkylamines (e.g., ethanolamines or propanolamines) with acrylic acids, such as are disclosed in French Pat. No. 1,581,361.

Suitable oligomers with (meth)acrylate functionality may also be used. Examples of such (meth)acrylate-functionalized oligomers include those having the following general formula:

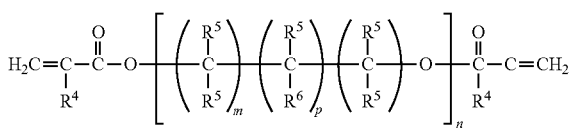

where $R^5$ represents a radical selected from hydrogen, alkyl of from 1 to about 4 carbon atoms, hydroxy alkyl of from 1 to about 4 carbon atoms, or

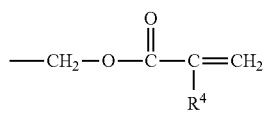

where $R^4$ is a radical selected from hydrogen, halogen, or alkyl of from 1 to about 4 carbon atoms; $R^6$ is a radical selected from hydrogen, hydroxyl, or

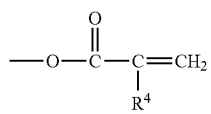

m is an integer equal to at least 1, e.g., from 1 to about 15 or higher, and desirably from 1 to about 8; n is an integer equal to at least 1, e.g., 1 to about 40 or more, and desirably between about 2 and about 10; and p is 0 or 1.

Typical examples of acrylic ester oligomers corresponding to the above general formula include di-, tri- and tetraethyleneglycol dimethacrylate; di(pentamethyleneglycol)dimethacrylate; tetraethyleneglycol diacrylate; tetraethyleneglycol di(chloroacrylate); diglycerol diacrylate; diglycerol tetramethacrylate; butyleneglycol dimethacrylate; neopentylglycol diacrylate; and trimethylolpropane triacrylate.

While di- and other polyacrylate esters, and particularly the polyacrylate esters described in the preceding paragraphs, can be desirable, monofunctional acrylate esters (esters containing one acrylate group) also may be used.

Suitable compounds can be chosen from among are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

Another useful class of materials are the reaction product of (meth)acrylate-functionalized, hydroxyl- or amino-containing materials and polyisocyanate in suitable proportions so as to convert all of the isocyanate groups to urethane or ureido groups, respectively.

The so-formed (meth)acrylate urethane or urea esters may contain hydroxy or amino functional groups on the non-acrylate portion thereof. (Meth)acrylate esters suitable for use may be chosen from among those of the formula:

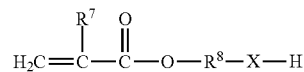

where X is selected from —O— and

where $R^9$ is selected from hydrogen or lower alkyl of 1 through 7 carbon atoms; $R^7$ is selected from hydrogen, halogen (such as chlorine) or alkyl (such as methyl and ethyl radicals); and $R^8$ is a divalent organic radical selected from alkylene of 1 through 8 carbon atoms, phenylene and naphthylene.

These groups upon proper reaction with a polyisocyanate, yield a monomer of the following general formula:

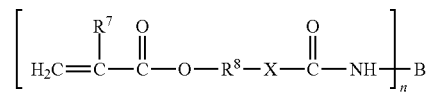

where n is an integer from 2 to about 6; B is a polyvalent organic radical selected from alkyl, alkenyl, cycloalkyl, cycloalkenyl, aryl, alkaryl, alkaryl and heterocyclic radicals both substituted and unsubstituted, and combinations thereof; and $R^7$, $R^8$ and X have the meanings given above.

Depending on the nature of B, these (meth)acrylate esters with urea or urethane linkages may have molecular weights placing them in the oligomer class (such as about 1,000 g/mol up to about 5,000 g/mol) or in the polymer class (such as about greater than 5,000 g/mol).

Other unsaturated reactive monomers and oligomers such as styrenes, maleimides, vinyl ethers, allyls, allyl ethers and those mentioned in U.S. Pat. No. 6,844,080B1 (Kneafsey et al.) can be used. Vinyl resins as mentioned in U.S. Pat. No. 6,433,091 (Xia) can also be used. Methacrylate or acrylate monomers containing these unsaturated reactive groups can also be used.

Of course, combinations of these (meth)acrylates and other monomers may also be used.

Solid Curable Polyurethane (Meth)Acrylate Resin

The solid polyurethane (meth)acrylate resin component for use in the present invention may be formed by reacting a polyol with a diisocyanate, to form a polyurethane comprising free isocyanato groups, and subsequently reacting said polyurethane comprising free isocyanato groups with a hydroxyl functionalised (meth)acrylate component, to form a curable polyurethane (meth)acrylate resin. As outlined above, the curable polyurethane (meth)acrylate resin used in the present invention is solid and has a molecular weight in the range of from about 5,000 g/mol to about 35,000 g/mol, and has a melting point in the range of from about 50° C. to about 80° C.

Suitably, the polyol has a molecular weight in the range of from 1,000 to 10,000 g/mol. For example, the polyol may be a polyester polyol, such as the reaction product of a polybasic carboxylic acid selected from a dibasic to a tetrabasic carboxylic acid with a polyhydric alcohol selected from a dihydric, trihydric, tetrahydric or pentahydric alcohol.

Suitably, the polyol is a polyester polyol having a molecular weight in the range of from 1,500 g/mol to about 4,500 g/mol, such as from about 2,000 g/mol to about 4,500 g/mol, for example from about 3,250 g/mol to about 3,750 g/mol.

The polyester polyol may have a hydroxyl number in the range of from 25 to 55, such as from about 27 to 54, for example from 27 to 34, as determined in accordance with DIN EN ISO 4629-2.

Suitably, the polyester polyol has a melting point in the range of from 45° C. to 75° C., such as from 55° C. to 75° C., preferably from 60° C. to 75° C. as determined by DSC.

The polyol may have a viscosity at 80° C. in the range of from 0.3 to 2.3 Pa·s as determined using a parallel plate method. The method used to determine viscosity at above room temperature is based on BS5350 Part B8 "Methods of test for adhesives. Determination of Viscosity".

The diisocyanate component is suitably an aromatic diisocyanate. For example, the diisocyanate may be selected from toluene diisocyanate, methylene phenyl diisocyanate and aliphatic diisocyanates selected from isophorone diisocyanate, hexamethylene diisocyanate and methylene bis(4-cyclohexylisocyanate).

The (meth)acrylate component which is reacted with the polyurethane may be selected from acrylic acid, hydroxyethylacrylate, hydroxyprorylacrylate, hydroxyethylmethacrylate, hydroxypropylmethacrylate, methacrylic acid, phthalic acid monoethyl methacrylate, maleic monoethyl methacrylate and succinic monoethyl maleate.

Synthesis of Solid Polyurethane (Meth)Acrylate Resin

Examples of starting materials used in the solid polyurethane (meth)acrylate resin synthesis:

(a) Polyols:

(Semi)-crystalline polyester polyols such as those available from Evonik under the Dynacoll trade name e.g. Dynacoll 7380, 7381, 7362

(b) Isocyanates:

Toluene diisocyanate

Methylene diphenyl isocyanate

Hydrogenated Xylylene diisocyanate (c) Capping agents:

Hydroxyethyl methacrylate

Glycerol dimethacrylate

Example of Solid Polyurethane (Meth)Acrylate Synthesis

Dynacoll 7380 (90.89 g), BHT (butylated hydroxytoluene) (0.03 g), MEHQ (4-methoxyphenol) (0.03 g) and phosphoric acid (0.007 g) were added to a reaction vessel and mixed while heating to 120° C. Temperature was allowed to decrease and the mixing was continued for 20 minutes at 100° C. DBTDL (dibutyltin dilaurate) (0.037 g) was added with mixing and then TDI (toluene diisocyanate) (6.28 g) was slowly added to the reaction mixture, while maintaining the temperature at 100° C. throughout the reaction. Mixing was continued for 2-3 hours or until percentage of isocyanate (NCO) reached equilibrium. A sample of the reaction mixture was titrated to quantify the remaining NCO. 90 wt % of the required HEMA (hydroxyethyl methacrylate) (~2.5 g) based on the titre was added to the reaction mixture followed by an addition of DBTDL (0.037 g). Mixing was continued for 3 hours and the reaction was monitored for NCO consumption via titration. The remaining 10 wt % of HEMA was added if the % NCO remaining equilibrated at >0.2% (molar). The reaction was stopped when the NCO content is <0.2% (molar).

The composition of the present invention comprises a solid thermoplastic polyurethane resin having a molecular weight in the range of from 40,000 g/mol to 100,000 g/mol and a melting point in the range of from 40° C. to 80° C. Suitable solid thermoplastic polyurethane resins include Pearlbond® 100, Pearlbond® 106, Pearlbond® 120, Pearlbond® 122, Pearlbond® 180, Pearlstick® 5712, Pearlstick® 5714 and Pearlstick® 40-70/08 which are commercially available from Lubrizol, Carrer del Gran Vial, 17, 08160 Montmelo, Barcelona, Spain.

Primer

As outlined above, the compositions of the invention may be used in conjunction with a primer. For example, a primer may be used to prime a substrate prior to application of the composition of the invention thereto. Particularly useful is the commercially available primer marketed by Henkel under the tradename Loctite® 7952. The primer composition suitably includes a thiourea or thiourethane, preferably one or more benzyolthioureas or benzoylthiourethanes. Suitable examples of benzoyl thioureas and/or benzoyl thiourethanes are disclosed in U.S. Pat. No. 9,371,473 B2 the contents of which is hereby incorporated by reference, in its entirety, particularly those disclosed from columns 3, line 56 to column 8, line 10 thereof.

Particularly preferred primers include one or more of benzoyl cyclohexyl thiourea, tetramethyl thiourea, tetra ethyl thiourea, dimethyldiethyl thiourea, benzoylthiourea, allylthiourea, acetyl thiourea, thiourethane, benzoyloctyl thiourea, and benzoylmorpholinothiourea.

EXAMPLES

Example 1

TABLE 1

| Component | Amount (wt %) |
|---|---|
| 2-Hydroxyethylemethacrylate (HEMA) | 20.39 |
| Solid TPU resin (Pearl Bond 100; Mw is between 40,000 g/mol and 100,000 g/mol; m.p. is between 40° C. and 80° C.) | 13.59 |
| Methacrylic acid | 8.73 |
| Solid polyurethane (meth)acrylate resin (Dynacoll 7380 polyurethane (meth)acrylate resin) | 52.96 |
| 1,4-butanediol dimethacrylate | 3 |
| Cumene hydroperoxide (80 wt. % solution in cumene). | 1.33 |

The composition of Table 1 was prepared by pre-mixing the HEMA with pellets of the solid TPU resin (Pearl Bond 100) under high shear. The remaining components (excluding the cumene hydroperoxide) were then added with mixing to the mixture of HEMA and TPU resin. After the mixture was homogenous, the cumene hyroperoxide was added and mixed in. Mixing was carried out in a sealed container using a Speedmixer™ model DAX 150.1 FVZ.K. The container was cooled to room temperature and the adhesive mixture therein solidified.

The GF-polyarylamide substrates were primed with Loctite® 7952 primer containing 5 wt % benzoylcyclohexylthiourea based on the total weight of the primer prior to application thereto of the composition of table 1. The stainless steel substrates were primed with Loctite® 7952 primer containing 0.5 wt % 2-hydroxyethyl methacrylate phosphate based on the total weight of the primer.

Application of adhesive to form a pre-applied adhesive was achieved by heating the composition of Table 1 to 65° C. where it became flowable and then applying the flowable composition to a primed lap shear substrate at room temperature, whereupon the composition rapidly formed a solid.

Sufficient quantities of the adhesive composition were applied to the lap shear substrates to ensure complete coverage of a 322.6 mm² (0.5 in. 2) bonding area.

The pre-applied adhesive composition was assessed for bonding glass-filled polyarylamide lap shear substrates to stainless steel lap shear substrates for the 0.5 in² bond area. Curing was effected as outlined in table 2.

TABLE 2

Various curing conditions for GF-polyarylamide substrates bonded to stainless steel

| | a | b | c | d | e | f | g | h |
|---|---|---|---|---|---|---|---|---|
| Curing conditions | | | | | | | | |
| Duration of application of pressure of 4 bar by heat press at 65° C. (min) | 1 | 1 | 5 | 5 | 10 | 10 | 20 | 20 |
| Duration at atmospheric pressure and room temperature before testing (hours) | 0.5 | 24 | 0.5 | 24 | 0.5 | 24 | 0.5 | 24 |
| Bond Strength | | | | | | | | |
| Tensile strength average (MPa) | 15.0 | 14.8 | 14.3 | 13.6 | 14.9 | 13.6 | 14.4 | 13.2 |
| Tensile strength standard deviation (MPa) | 0.9 | 1.2 | 1.3 | 2.0 | 0.2 | 0.6 | 0.3 | 1.1 |

Tensile strengths were determined in accordance with ISO 4587. Results are shown as a mean value with the standard deviation within a set of test specimen shown. Assemblies were tested with no induced gap (zero gap) unless stated otherwise.

It is clear from table 2 that there is very little difference between the resulting tensile strengths when curing at 65° C. is for 1 minute or 20 minutes. Therefore the inventive compositions allow can be cured on demand.

In Table 3 a comparison of tensile strengths for the composition of the invention and for a 2K methyl methacrylate structural bonder is provided.

TABLE 3

| | Stainless steel/ stainless steel (MPa) | Glass-filled polyarylamide/ stainless steel (MPa) |
|---|---|---|
| Pre-applied composition from table 1 | 21.2 | 15 |
| 2K MMA (Loctite ® HHD8540) | 22.4 | 14.5 |

Table 3 demonstrates that the per-applied adhesive of the present invention gives comparable adhesion to a commercially available 2K methyl methacrylate adhesive.

Example 2

TABLE 4

| Component | Amount (wt %) |
|---|---|
| 2-Hydroxyethylemethacrylate (HEMA) | 18.9 |
| Solid TPU resin (Pearl Bond 100; Mw is between 40,000 g/mol and 100,000 g/mol; m.p. is between 40° C. and 80° C.) | 12.6 |
| Ethoxylated bis-phenol A dimethacrylate | 10 |
| Methacrylic acid | 9 |
| Solid polyurethane (meth)acrylate resin (Dynacoll 7380 polyurethane (meth)acrylate resin) | 45 |
| 1,4-butanediol dimethacrylate | 3 |
| Cumene hydroperoxide (80 wt. % solution in cumene) | 1.5 |

The composition of Table 4 was prepared in the same manner as that in Example 1 above.

The pre-applied adhesive composition of example 2 was assessed for bonding a glass-filled polyarylamide substrate to another glass-filled polyarylamide substrate for a half-inch bond area. One of the glass-filled polyarylamide substrates was primed with Loctite® 7952 primer containing 5 wt % benzoylcyclohexylthiourea, prior to application thereto of the composition of table 4. The second glass-filed polyrarylamide substrate was primed with Loctite® 7952 alone. The first substrate and the second substrate were mated using a heat press, at a pressure of 4 bar, and at a bond line temperature of 65° C. which was maintained for 20 minutes, prior to resting at room temperature for 30 minutes.

Bond strength for the pre-applied adhesive composition of example 2 was assessed for the bonding of two glass-filled polyarylamide substrates using zero gap and 0.125 mm gap conditions. The bond strengths are reported in Table 5. Once again, bond strengths (tensile strengths) were assessed in accordance with ISO 4587.

TABLE 5

Bond strength GF-Polyarylamide/GF-Polyarylamide (MPa)

|  | Zero Gap | 0.125 mm Gap |
| --- | --- | --- |
| Tensile strength average (MPa) | 5.67 | 10.10 |
| Tensile strength standard deviation (MPa) | 0.47 | 0.63 |
| Failure mode* | Mixed CF/AF | CF |

*CF = cohesive failure i.e. film of adhesive on both of lap shears,
AF = adhesive failure - film ofadhesive comes off one of substrates Advantageously, the compositions of the invention may be employed to bond passive substrates such as plastics. Furthermore, improved adhesive performance was observed with the presence of a gap spacer.

Example 3

TABLE 6

| Component | Amount (wt %) |
| --- | --- |
| 2-Hydroxyethylemethacrylate (HEMA) | 18.6 |
| Solid TPU resin (Pearl Bond 100; Mw is between 40,000 g/mol and 100,000 g/mol; m.p. is between 40° C. and 80° C.) | 12.4 |
| P3 microcaps* | 4 |
| Methacrylic acid | 9 |
| Solid polyurethane (meth)acrylate resin (Dynacoll 7380 polyurethane (meth)acrylate resin) | 52 |
| 1,4-butanediol dimethacrylate | 3 |
| APH | 1 |

*microencapsulated benzoylperoxide sold by Henkel Loctite

The composition of example 3 was prepared in the same manner as the composition of examples 1 and 2, by premixing the HEMA with pellets of the solid TPU resin (Pearl Bond 100) under high shear, and subsequently adding the remaining components within mixing. Mixing was carried out in a sealed container using a Speedmixer™ model DAX 150.1 FVZ.K. The container was cooled to room temperature and the adhesive mixture therein solidified.

Prior to application of the pre-applied adhesive, the substrates were primed. The pre-applied adhesive composition was assessed for bonding glass-filled polyarylamide substrates to stainless steel substrates to form a 0.5 in² bond area. The glass-filled polyarylamide substrate was primed with Loctite® 7952 prior, and the stainless steel substrate was primed with Loctite® 7952 containing 0.5 wt % HEMA phosphate.

Application of adhesive composition of Table 6 to form a pre-applied adhesive was achieved by heating said composition to 65° C. where it became flowable and then applying the flowable composition to the primed glass-filled polyarylamide substrate at room temperature, whereupon the composition rapidly formed a solid. The pre-applied adhesive on the primed glass-filled polyrarylamide substrate and the primed stainless steel substrate were mated using a heat press with a bond line temperature of 65° C. and a pressure of 4 bar, for 20 minutes, followed by 24 hours at room temperature and atmospheric pressure. The tensile strength of the adhesive bond was then assessed in accordance with ISO 4587. The average bond strength for the cured composition of example 3 is on glass-filled polyarylamide substrates bonded to SUS304 stainless steel substrates is shown in Table 7.

TABLE 7

Bond strength of adhesive bonding GF-Polyarylamide/SUS304 substrates (MPa)

|  | Zero Gap |
| --- | --- |
| Tensile strength average (MPa) | 11.43 |
| Tensile strength standard deviation (MPa) | 0.47 |
| Failure mode* | Mixed CF/AF |

*CF = cohesive failure i.e. film of adhesive on both of lap shears,
AF = adhesive failure - film of adhesive comes off one of substrates Example 4

A thin film of the adhesive composition of Example 1 was prepared by dispensing the molten adhesive composition of Example 1 between two sheets of a polyester release liner (melinex) sandwiched between two heated glass plates. No spacer was used, to make the sheet as thin as possible. Once dispensing was complete, the glass plates were allowed to cool and the thin film comprising the solidified adhesive composition of Example 1 between the two sheets of melinex was removed and cut into strips. The tensile strength of the thin film of adhesive was assessed for bonding a primed glass-filled polyarylamide substrate with a primed stainless steel substrate. The glass-filled polyarylamide substrate was primed with Loctite® 7952 containing 5 wt % benzoylcyclohexylthiourea, and the stainless steel substrate was primed with Loctite® 7952 containing 0.5 wt % HEMA phosphate. The release liner was removed from one side of the adhesive film and the adhesive film was applied (pressed by hand) to the primed glass-filled polyarylamide substrate. Thereafter the second release liner was removed from the other side of the adhesive film and the pre-applied adhesive on the glass-filled polyarylamide substrate was mated with the primed stainless steel substrate using a heat press, with a bond line temperature of 65° C. and a pressure of 4 bar, for 1 minute, followed by 24 hours at room temperature and atmospheric pressure. The tensile strength of the adhesive bond was then assessed in accordance with ISO 4587. The average bond strength for the cured composition of example 1 is on glass-filled polyarylamide substrates bonded to SUS304 stainless steel substrates is shown in Table 8.

TABLE 8

| Bond strength of adhesive bonding GF-Polyarylamide/ SUS304 substrates (MPa) | |
|---|---|
| | Zero Gap |
| Tensile strength average (MPa) | 9.2 |
| Tensile strength standard deviation (MPa) | 1.2 |
| Failure mode* | Mixed CF/AF |

*CF = cohesive failure i.e. film of adhesive on both of lap shears,
AF = adhesive failure - film of adhesive comes off one of substrates The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

What is claimed is:

1. A redox curable composition comprising:
   a liquid (meth)acrylate monomer component;
   a solid thermoplastic polyurethane resin having a molecular weight in the range of from 40,000 g/mol to 100,000 g/mol and a melting point in the range of from to 80° C.;
   a solid curable polyurethane (meth)acrylate resin having a molecular weight in the range of from 5,000 g/mol to 35,000 g/mol, and a melting point in the range of from 50° C. to 80° C.; and
   a curing component for curing the liquid (meth)acrylate monomer component.

2. The composition of claim 1, wherein the liquid (meth)acrylate monomer is present in an amount of about 10 wt % to about 60 wt % based on the total weight of the curable composition.

3. The composition of claim 1, wherein the solid thermoplastic polyurethane resin is present in an amount of from about 5 wt % to about 40 wt % based on the total weight of the curable composition.

4. The composition of claim 1 wherein the solid curable methacrylate resin is present in an amount of from about 20 wt % to about 70 wt % based on the total weight of the curable composition.

5. The composition of claim 1, wherein the curing component for curing the liquid (meth)acrylate monomer component is present in an amount of from about 0.1 to about 10% based on the total weight of the composition, and/or wherein the curing component comprises a peroxide.

6. The composition of claim 1, wherein the liquid (meth) acrylate monomer component is one or more selected from those having the formula:

$$H_2C=CGCO_2R^8,$$

wherein G is hydrogen, halogen or alkyl groups having from 1 to 4 carbon atoms, and $R^8$ is selected from alkyl, cycloalkyl, alkenyl, cycloalkenyl, alkaryl, or aryl groups having from 1 to about 16 carbon atoms.

7. The composition of claim 1, wherein the curing agent is one or more selected from the group consisting of: 1-acetyl-2-phenylhydrazine, N,N-Dimethyl para toluidine, N,N-diethyl para toluidine, N,N-diethanol para toluidine, N,N-dimethyl ortho toluidine, N,N-dimethyl meta toluidine, indoline, 2-methylindoline, isoindoline, indole, 1,2,3,4-tetrahydroquinoline, 3-methyl-1,2,3,4-tetrahydro-quinoline, 2-methyl-1,2,3,4-tetrahydroquinoline, and 1,2,3,4-tetrahydroquinoline-4-carboxylic acid.

8. The composition according to claim 1, further comprising an initiator of free radical polymerization.

9. The composition according to claim 8, wherein the initiator of free radical polymerization is one or more selected from the group consisting of: cumene hydroperoxide ("CHP"), para-menthane hydroperoxide, t-butyl hydroperoxide ("TBH"), t-butyl perbenzoate, benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane, t-amyl hydroperoxide, 1,2,3,4-tetramethylbutyl hydroperoxide and combinations thereof.

10. The composition according to claim 8, wherein the free radical cure inducing component comprises an encapsulated peroxide.

11. The composition according to claim 1, further comprising a cure accelerator.

12. The composition according to claim 11, wherein the cure accelerator comprises one or more metallocenes.

13. The composition according to claim 1, wherein the redox curable composition is an anaerobically curable composition.

14. A cured composition formed by curing the curable composition according to claim 1.

15. The cured composition of claim 14, formed by curing the curable composition by exposing said curable composition to an anaerobic environment.

16. The cured composition of claim 15, wherein said curable composition is exposed to an anaerobic environment for a period in the range of from about 1 minute to 30 minutes optionally wherein said curing occurs in the temperature range of from about 40° C. to about 100° C.

17. A method for bonding together two substrates, comprising the steps of:
   applying the redox curable composition according to claim 1 to at least one of the substrates, mating together the substrates to form a mated assembly for a time sufficient for cure of the redox curable composition to take place.

18. The method of claim 17, wherein cure of the redox curable composition is initiated by heating the curable composition, and/or exposing the curable composition to pressure.

19. The method of claim 17, wherein the substrates are mated using a heat press.

20. The method of claim 19, wherein the heat press applies a pressure of at least 2 bar to the mated assembly.

21. The method of claim 17, wherein heat and/or pressure are applied to the mated assembly for a period of 30 seconds or more.

22. The method of claim 21, wherein the heat and/or pressure is applied to the mated assembly for a period of from 1 minute to 20 minutes.

23. The method of claim 17, wherein one or both substrates are primed with a primer prior to application of the redox curable composition.

24. The method of claim 23, wherein the primer comprises a thiourea and or a thiourethane.

\* \* \* \* \*